US012794994B2

(12) United States Patent
Zunke et al.

(10) Patent No.: US 12,794,994 B2
(45) Date of Patent: Nov. 10, 2026

(54) SYSTEM FOR USE-CASE CLASSIFICATION

(71) Applicant: THALES DIS CPL USA, INC., Austin, TX (US)

(72) Inventors: Michael Zunke, Kirchheim (DE); Marc Boillot, Plantation, FL (US)

(73) Assignee: THALES DIS CPL USA, Inc., Austin, TX (US)

( * ) Notice: Subject to any disclaimer, the term of this patent is extended or adjusted under 35 U.S.C. 154(b) by 944 days.

(21) Appl. No.: 17/902,944

(22) Filed: Sep. 5, 2022

(65) Prior Publication Data

US 2024/0080371 A1 Mar. 7, 2024

(51) Int. Cl.

| | |
|---|---|
| ***G06N 20/00*** | (2019.01) |
| ***G06F 8/77*** | (2018.01) |
| ***G06F 11/3604*** | (2025.01) |
| ***H04L 67/50*** | (2022.01) |
| ***H04L 67/561*** | (2022.01) |

(52) U.S. Cl.
CPC .............. *H04L 67/561* (2022.05); *G06F 8/77* (2013.01); *G06F 11/3604* (2013.01); *G06N 20/00* (2019.01); *H04L 67/535* (2022.05)

(58) Field of Classification Search
None
See application file for complete search history.

(56) References Cited

U.S. PATENT DOCUMENTS 8,429,103 B1 4/2013 Aradhye et al.
8,607,190 B2 12/2013 Coldicott et al.
8,924,938 B2 12/2014 Chang et al.
10,956,300 B1 3/2021 Yamane et al.
2007/0074149 A1 3/2007 Ognev et al.
2012/0047200 A1* 2/2012 Szabo ..................... H04L 41/00 709/224
2013/0219505 A1* 8/2013 Xue ........................ H04L 63/08 726/26
2014/0258506 A1* 9/2014 Stickle ................. H04L 67/535 709/224
(Continued)

OTHER PUBLICATIONS

Roehm et al. (Roehm) "Towards Identification of Software Improvements and Specification Updates By Comparing Monitored and Specified End-User Behavior." 2013 IEEE International Conference on Software Maintenance, Date of Conference: Sep. 22-28, 2013, DOI: 10.1109/ICSM.2013.73 (Year: 2013).*
(Continued)

*Primary Examiner* — Xuyang Xia

(57) ABSTRACT

Provided is a method for use-case analysis of an application. It includes instrumenting a software application or an environment to generate execution traces at use-case reference points; capturing the execution traces during user interaction with the software application during a use-case scenario; applying a classification model to execution traces correlated to a sequence of interaction steps; and to report a use of the app. A machine learning module automatically adapts, updates and applies the classification model on use-case scenarios, thereby evidencing whether the customer successfully completed these use cases, and helping the product vendor understand if the customer is receiving value delivered by, and built into, the product or application. Other embodiments disclosed.

13 Claims, 13 Drawing Sheets

Configuration A: Instrumented Code/Device

(56) References Cited

U.S. PATENT DOCUMENTS

| | | | | |
|---|---|---|---|---|
| 2015/0101059 | A1* | 4/2015 | Galpin | G06F 21/12 726/26 |
| 2015/0262107 | A1* | 9/2015 | Singh | H04L 67/535 705/7.39 |
| 2015/0310336 | A1 | 10/2015 | Sotela et al. | |
| 2016/0284035 | A1* | 9/2016 | Muttik | G06Q 50/18 |
| 2018/0253637 | A1 | 9/2018 | Shen | |
| 2019/0073293 | A1 | 3/2019 | Sharma et al. | |
| 2019/0236394 | A1* | 8/2019 | Price | G06V 10/945 |
| 2019/0347181 | A1* | 11/2019 | Cranfill | H04L 63/102 |
| 2021/0149788 | A1* | 5/2021 | Downie | G06F 11/3604 |
| 2022/0100647 | A1 | 3/2022 | Hamid | |
| 2022/0300582 | A1* | 9/2022 | Iyer | G06F 21/53 |
| 2023/0281278 | A1* | 9/2023 | Fernandez Garcia | G06F 21/105 705/59 |

OTHER PUBLICATIONS

International Search Report (PCT/ISA/2010) & Written Opinion (PCT/ISA/237) mailed by ISA/EP on Nov. 2, 2023 for corresponding International Application pursuant to the PCT, N°PCT/US2023/031954 (14 pages).

Roehm Tobias et al: "Towards Identification of Software Improvements and Specification Updates by Comparing Monitored and Specified End-User Behavior", 2013 IEEE International Conference On Software Maintenance, IEEE, Sep. 22, 2013 (Sep. 22, 2013), pp. 464-467, XP032528513, ISSN: 1063-6773, DOI: 10.1109/ICSM.2013.73 [retrieved on Nov. 27, 2013] abstract; p. 464-p. 466.

Xin Qi et al: "Identifying Features of Android Apps from Execution Traces", 2019 IEEE/ACM 6th International Conference On Mobile Software Engineering and Systems (Mobilesoft), IEEE, May 25, 2019 (May 25, 2019), pp. 35-39, XP033608159, DOI: 10, 1109/MOBILESOFT.2019.00015 [retrieved on Aug. 27, 2019] abstract ; p. 35-p. 38.

Tian Zhenzhou et al: "Plagiarism Detection of Multi-Threaded Programs via Siamese Neural Networks", IEEE Access, IEEE, USA, vol. 8, Sep. 1, 2020 (Sep. 1, 2020), pp. 160802-160814, XP011808533, DOI: 10.1109/ACCESS.2020.3021184 [retrieved on Sep. 10, 2020]; abstract; p. 160802-p. 160812.

Meng Lun et al: "Detecting anomalies in microservices with execution trace comparison", Future Generation Computer Systems, Elsevier Science Publishers. Amsterdam, NL, vol. 116, Nov. 4, 2020 (Nov. 4, 2020), pp. 291-301, XP086401648, ISSN: 0167-739X, DOI: 10.1016/J.FUTURE.2020.10.040 [retrieved on Nov. 4, 2020] abstract; p. 291-p. 299.

* cited by examiner

Configuration A: Instrumented Code/Device

1A: Instrumenting code in an app to produce an instrumented app
1B: Using the instrumented app on use-cases to generate ref traces Configuration B: Instrumented Environment

2A: Instrumenting an environment of an app to produce an instrumented env
2B: Using the instrumented env on use-cases to generate ref traces 3: Training a classification model from the ref traces to learn features
4: Deploying the classification model independently to recognize use cases
5: Updating the classification model to evolve with new use-cases.
6: Share use-case information with Independent Service Vendors (ISV)

FIG. 1A

SYSTEM FOR USE-CASE CLASSIFICATION

TECHNICAL FIELD

The present invention relates generally to understanding how a user uses a product or service, and more particularly to a computer-implemented method, that by way of artificial intelligence, learns and reports use-case information on how the products and services are utilized locally or within an environment.

BACKGROUND

Cloud computing is a technology that has grown worldwide, being driven by the largest companies in the technological sectors. Cloud computing has seen an explosion in the last few years with many organizations moving parts, if not all, of their services to the "cloud" as opposed to building out infrastructure on-premise. Cloud as a term basically refers to services or other infrastructure that is available over the Internet. The primary service tiers are Infrastructure as a Service (IaaS), Platform as a Service (PaaS), and Software as a Service (SaaS). There are a multitude of examples for each of these tiers, and each interact at various levels with differing products and services, and each affect the customer experience in its own unique way. An Independent Software Vendor (ISV) is an independent software vendor that deliver all types of software and/or Software-as-a-Service (SaaS) offerings to address customer business or technical requirements.

Software and service vendors that provide products and services to the cloud often ask how are their customers actually use their service and products. Customers need the product or service to function the way they need in order to solve their problem or issue. It needs to be convenient and easy to use, as well as reliable and efficient. A remarkable customer experience is critical to the sustained growth of any business. A positive customer experience promotes loyalty, helps the company retain customers, and encourages brand advocacy. Customer experience is a holistic totality of cognitive, affective, sensory, and behavioral consumer responses during all stages of the product and service use process including pre-purchase, consumption, and post-purchase stages. The companies providing products and services, and the customers using them, all need information, from the moment of first interaction to days and months after making a purchase.

However, companies are often not adequately equipped to gauge actual use and consumption of the product offerings. A need therefore exists for improving customer experience and reporting of use-case value of a product or service.

SUMMARY

One main problem that many software and service vendors face understands how the customers actually use the application and/or service. Absent this information, the companies may not be aware of, or even understand the relevant use cases with respect to their product offering, and whether or not if certain use cases are even performed at all, or even how the product and services are exercised in practice. Such use-case information could not only provide continued evidence whether the customer successfully completed these use cases, but could help the company understand if the customer is actually receiving the value delivered by, and built into, the product or application. Knowledge of details associated with use-case scenarios could help reveal if the customer even performed the desired operations, along with additional insight as to whether they would continue to buy or use the service.

One encountered difficulty with meeting the expectations of a favorable customer experience is that meaningful usage information from the product or service needs to be collected from the field and interpreted. Although pilot programs and beta customer programs help provide some reasonable insight into usability, many practical issues and use-case scenarios go unreported during actual use in the customers hands. Furthermore, practices for monitoring customer experiences that include customer service logs or tracing activities are difficult and time consuming for the average customer agent to interpret, let alone, by specialized service, technicians later brought in to analyze the complex log information. The generation of meaningful information in a usage log requires manual, intelligent implementation from within the application; an activity that is often overlooked and not easy to implement.

Herein contemplated is an invention for automatic generation of relevant information by the application itself. In one configuration, it uses instrumented code to extend the application without the need to change source code to generate device trace information. In another configuration, it uses an instrumented environment within which the application runs to generate environment trace information. The trace information is meaningful for helping an Independent Service Vendor (ISV) understand how the user uses their application. Reference traces with verbose information collections are generated by having users perform their use cases on the application and have them annotate what they did. This can also include test scenarios to represent certain use cases. The reference use cases are used to train a classification model. The traces collected from the field are classified by the model, to understand the use cases performed by the users in the field. A significance analysis is performed on the collected elements in the trace, which can reduce the amount of collected data.

A method for automatically analyzing a usage of a software application is also contemplated. It includes the steps of instrumenting the software application and/or an environment in which the application runs to generate execution traces at use-case reference points; capturing the execution traces during user interaction with the software application during a use-case scenario, and learning and applying a classification model to execution traces to report how the app is used. The method includes generating an extensible and arbitrarily large set of reference traces by exercising the use of the application or service performing different users or automate tests. These reference traces are used to train a machine learning module for classification of arbitrary traces later presented to the system, and to map the presented traces to known use cases. This provides for a high-level understanding of a use case performed by the user without the need to perform a detailed analysis, and without the need to abstract the operations performed already inside the application. The method is automatic in the sense that it is automated for performing continual use-case learning and analysis during product use without intervention by a user, analyst, or agent.

BRIEF DESCRIPTION OF THE DRAWINGS

The accompanying drawings, which are incorporated in and constitute a part of this description, illustrate embodiments consistent with the invention and, together with the description, serve to explain the principles of the invention.

FIG. 1A illustrates a high-level method for generating a use-case mapper to help an ISV understand what an application does in accordance with an embodiment;

Figure 1B:
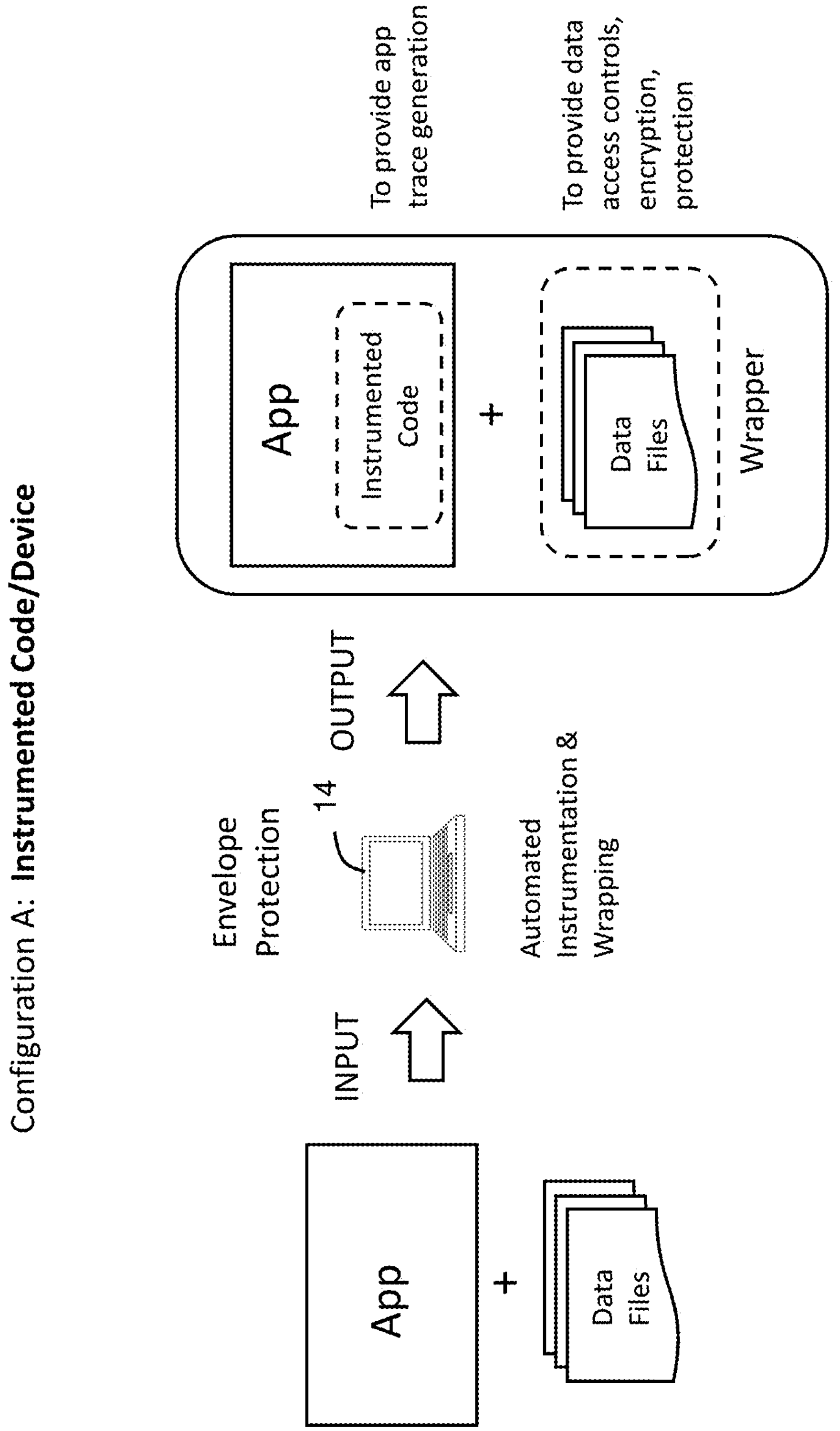
FIG. 1B illustrates the instrumenting of code/device to generate trace information for the use-case mapper of FIG. 1A in accordance with an embodiment.

Specific embodiments in this invention have been shown by way of example in the foregoing drawings and are hereinafter described in detail. The figures and written description are not intended to limit the scope of the inventive concepts in any manner. Rather, they are provided to illustrate the inventive concepts to a person skilled in the art by reference to particular embodiments.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

FIG. 1A illustrates a high-level overview of a method for generating a use-case mapper. The use-case mapper is provided to make it easier for an Independent Service Vendor (ISV) to understand what their customers do with an application. The method may include more or less than the number of steps shown and is not limited to only those steps, or the order in which they are shown. The steps may be disjoint in space and time. Notably, only a high-level overview of the steps are first provides. Details of each step, and how the steps interrelate to one another, will be explained in further detail with reference to certain drawings.

The method of FIG. 1A can start at step 1A, where an application (hereinafter "app") is instrumented to produce an instrumented app. Instrumenting the code is done to understand the use-case. For example, an ISV may desire to instrument a certain app to better appreciate and understand how it is used, and/or, how the app is used in an environment. Instrumentation may be performed at the code level, for example, within the software program at the application level (or even embedded within the device firmware). This can be done manually, by adding respective function calls that add information to an execution trace. Instrumenting an app by way of an external-based system is shown and explained ahead in FIG. 1B.

Alternatively, or in combination, instrumentation may also be performed at the environment level; that is, by way of instrumenting the environment of the application. This corresponds to step 2A. This second configuration for instrumentating an environment is shown, and explained ahead, in FIG. 1C.

Returning back to FIG. 1A, At step 1B, the instrumented app is used on known use-cases to generate reference device traces, also referred to as reference traces. The "use" of the application/service is performed on known use cases to generate reference traces. Reference traces with verbose info collection are generated by requesting users to perform their own use cases on the application and have them annotate what they did. This annotation activity can be provided by way of the instrumented app in certain situations. The requested use-cases may also include test scenarios in order to represent certain ISV requested use cases. Use cases often help to better obtain an understanding of this value. One advantage of the use-case mapper, is in detecting "what" the user does on the application, including, but not limited to, which functionality of the app they use at the device level or within their environment. This provides an idea, or indication, of "value" the application provides to the user.

Alternatively, or in combination, instrumentation may also be performed at the environment level, as previously noted; that is, by way of instrumenting the environment of the application to produce reference environment traces, also referred to as reference traces. This corresponds to step 2B. This second configuration for instrumentation the environment is shown, and explained ahead, in FIG. 1C.

As seen in the next step, the reference use cases (device references and/or environment references) will be used to train a classification model. These traces are collected from the field and will get classified by the model, to understand how the app is used. Accordingly, at step 3, a classification model is trained from the reference traces to learn features of significance or value, for example, what the user does with the app or how it is used. Alternatively, salient features may be selected manually to train the classification model to recognize the use cases. Significance analysis of the collected elements in the trace is used to reduce collected data. The data collection is tuned to only collect meaningful data based on analysis which elements deliver significant features to drive the model. This tuning aspect may also be provided by way of the instrumented app in certain situations.

At step 4, the classification model is independently deployed to recognize use cases. In one arrangement, as shown in FIG. 1D, a heavy-weight classification models 80 resides in the cloud 100 to receive instrumented user traces within that environment to classify app usage. Alternatively, in another arrangement, as shown in FIG. 1E, a light-weight classification model 13 may be packaged and deployed onto the user's device 102 to interpret and make use-case classification (and/or updates to the model) locally, to reduce data transmitted back to the ISV in the network. A combination classification is also contemplated, for example leveraging and connecting machine learning modules 17 in the cloud, coupled to the device classifier 13, to the heavy-weight classifiers 80 (of FIG. 1D). Notably, deploying the classification model on unseen use-cases will generate new traces from the application/service that was instrumented.

At step 5, the new user dependent traces are entered into the classification model, where the classification model is updated to evolve with new use-case value.

Briefly, with respect to step 5, FIG. 1D illustrates an example use case where a service provider desires to observe user interaction in the software program, or mobile device, or browser, or other component running the app, wherein the use case analysis is performed in the cloud. The use-case mapper 16 provides for simplification and reduction of data transferred to the software (SW) vendor/Service provider/ISV. The generated traces are also provided in an easier to interpret format so the user can also understand, inspect, and interpret their use-case activity, or that of others similarly using the application under evaluation. This provides the ISV an easier opportunity to convince and/or propose additional application functionality to the customer. Each contemplated configuration allows for limiting any exposure of user Privacy information and Data sharing.

Briefly, with respect to step 5, FIG. 1E illustrates an example use-case where the application runs locally at the users place, for example, on the user's device (e.g., mobile, IoT device or PC/laptop, etc.), analysis is deployed (e.g. by way of use-case mapper 16) in the user's environment. In this case of "deployment at the user", those users that consent to collecting and sharing information may contribute this information to the ISV to improve the classification model at a central-level. In other arrangements, the user may elect to participate in use-case scenarios for further value categorization and determination.

Returning back to FIG. 1A, at step 6, the use-case information can then be shared with Independent Service Vendors (ISV) 70, thereby allowing them to react on the observed results. Understandably, the term "value" has different connotations. Product value refers to the overall quality of a product as determined by its technical merits. Product value is the benefit that a customer gets by using a product to satisfy their needs, minus associated costs. Customer value is the customer's perception of the worth of the product or service, where worth can mean several things: the benefit these products or services provide to the target market, or the value for money they offer. Understanding the value of the product, application, service and/or device is necessary to attract potential customers and better service existing ones. Examples of value include: "customer success" persona to understand what is used, and how much the customer is getting from using the application; "sales" to see the value and know how to manage a flexible pricing, allowing to do better value based pricing; and, "product management" to better know what is really done with the application driving what to expand, realize new ways the application is used, better manage how to expand/improve the offer/application.

Reverting briefly back to step 1, it was previously mentioned that FIG. 1B illustrates an external-based system for generating trace information in accordance with an embodiment. The system comprises an envelope protection unit 14 that receives as input, an application and data files, and generates as output, instrumented code within the application, and a wrapper for the data files associated with the application. The instrumented code provides for generation of traces, and/or trace related information. The wrapper provides data access controls, encryption, and protection. Envelope protection 14 provides the binary instrumentation automatically, which adds trace generation means to the application code. It provides for automatic injection of trace generating code, that possibly includes possibly relevant user-scenario data into the generated trace.

Briefly, instrumentation can be used to measure of a product's performance, to diagnose errors, and to write trace information. Instrumentation can be of two types: source instrumentation and binary instrumentation. Instrumentation can include profiling static dynamic program behavior, logging events or activities, and inserting timers into functions, methods or processes. Instrumented code provides for rich execution traces that are easy to interpret and that generate meaningful usage information. Here, the instrumentation is achieved by either binary/bytecode rewriting of the software application or by adding generic observation means to the application (or to the service environment).

In one arrangement, the envelope protection 14 instruments code by way of a binary rewrite that adds stubs into code of the software program to capture execution traces that include function, method, stack, and heap information concerning the software program with respect to a sequence of interaction steps, whether by the user and/or by the communication network (e.g. cloud load balancer, IAM components). Binary rewriting is a general technique to modify existing executable programs, typically to insert instrumentation of some kind. The most common form of instrumentation collects profiling information. One might count the number of times that each subroutine is called, for example, or the number of times that each loop iterates. Such counts can be stored in a buffer in memory, and provided at the end of execution. Alternatively, one might log all memory references. This may be achieved by way of (1) a disassembler frontend that parses machine code instructions from the input binary, (2) the recovery of control flow information such as jump targets, etc., (3) a transformation that inserts, deletes, replaces, or relocates binary code, and (4) a backend that emits the modified binary file. Because the binary rewriting process may move instructions, some form of control flow recovery is necessary in order to adjust the set of jump targets in the rewritten binary.

At the high-level, the envelope protection 14 is an automatic file wrapper that provides protection against software reverse engineering through file encryption, code obfuscation and system-level anti-debugging. It ensures that algorithms, trade secrets, and professional know-how embedded in the software are secured against hackers. It uses binary instrumentation to extend the application without the need to change source code. The added code (by way of binary instrumentation) generates trace information, somewhat similar to a profiler, but parametriseable for collecting data that is meaningful. The added code sends collected info to a home account or other location or source selected or needed to handle requests regarding user consent for data access. It can also add consent request and accordingly taylor how data collection is performed.

Figure 1C:
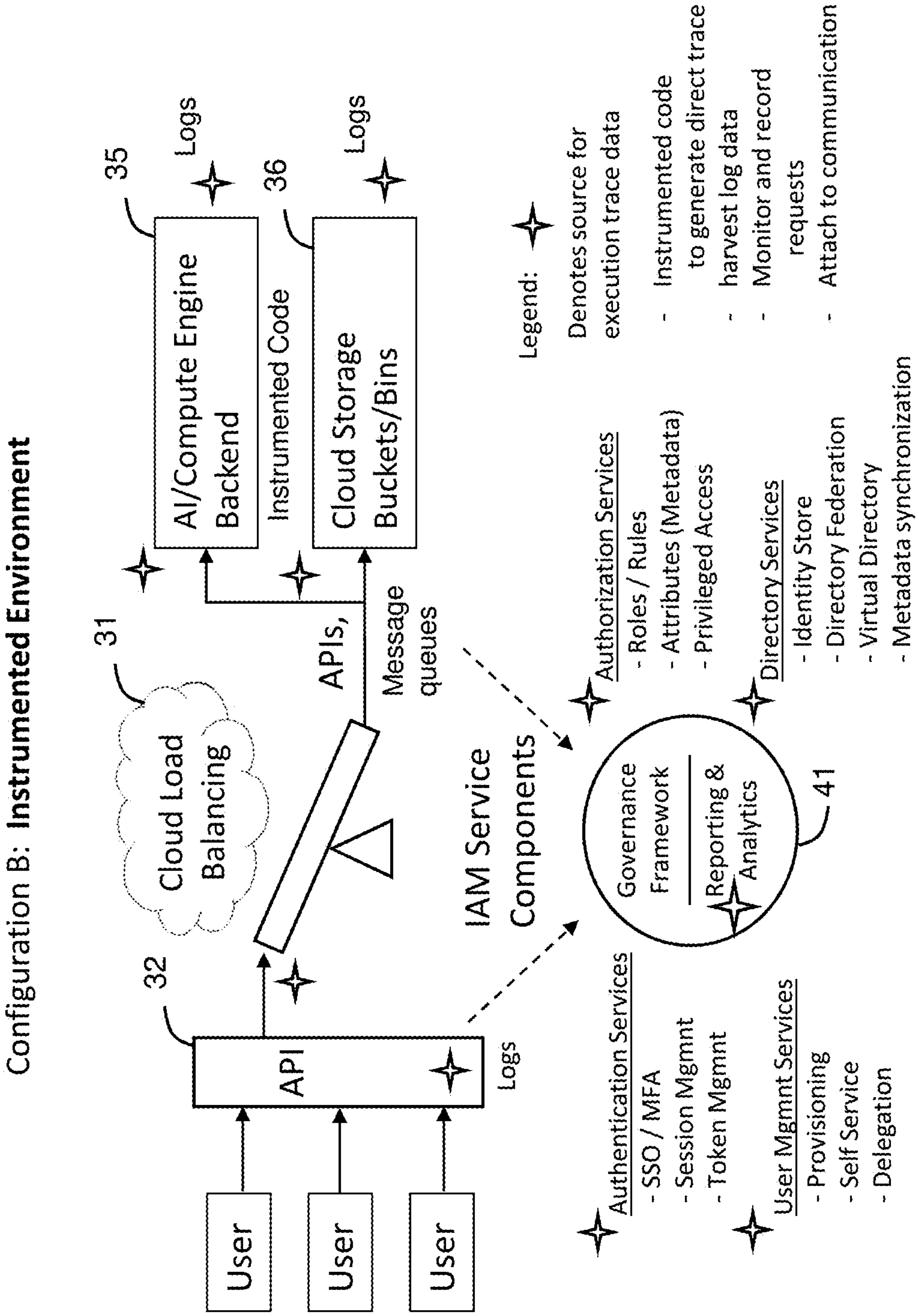
FIG. 1C illustrates the instrumenting of an environment to generate trace information for the use-case mapper of FIG. 1A in accordance with an embodiment.
Figure 1D:
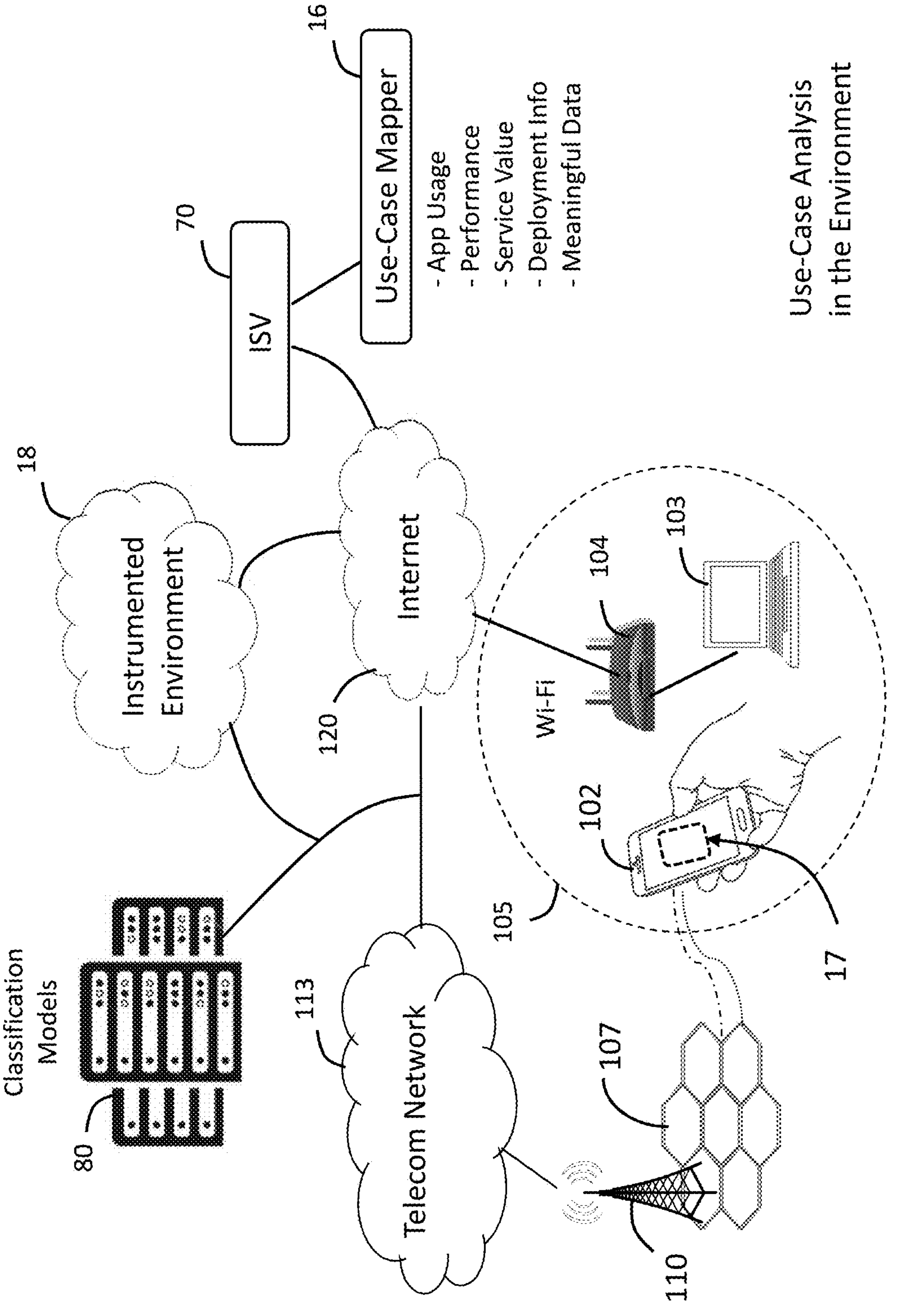
FIG. 1D depicts an environment for analyzing a usage of a product and/or software application in accordance with one embodiment.
Figure 1E:
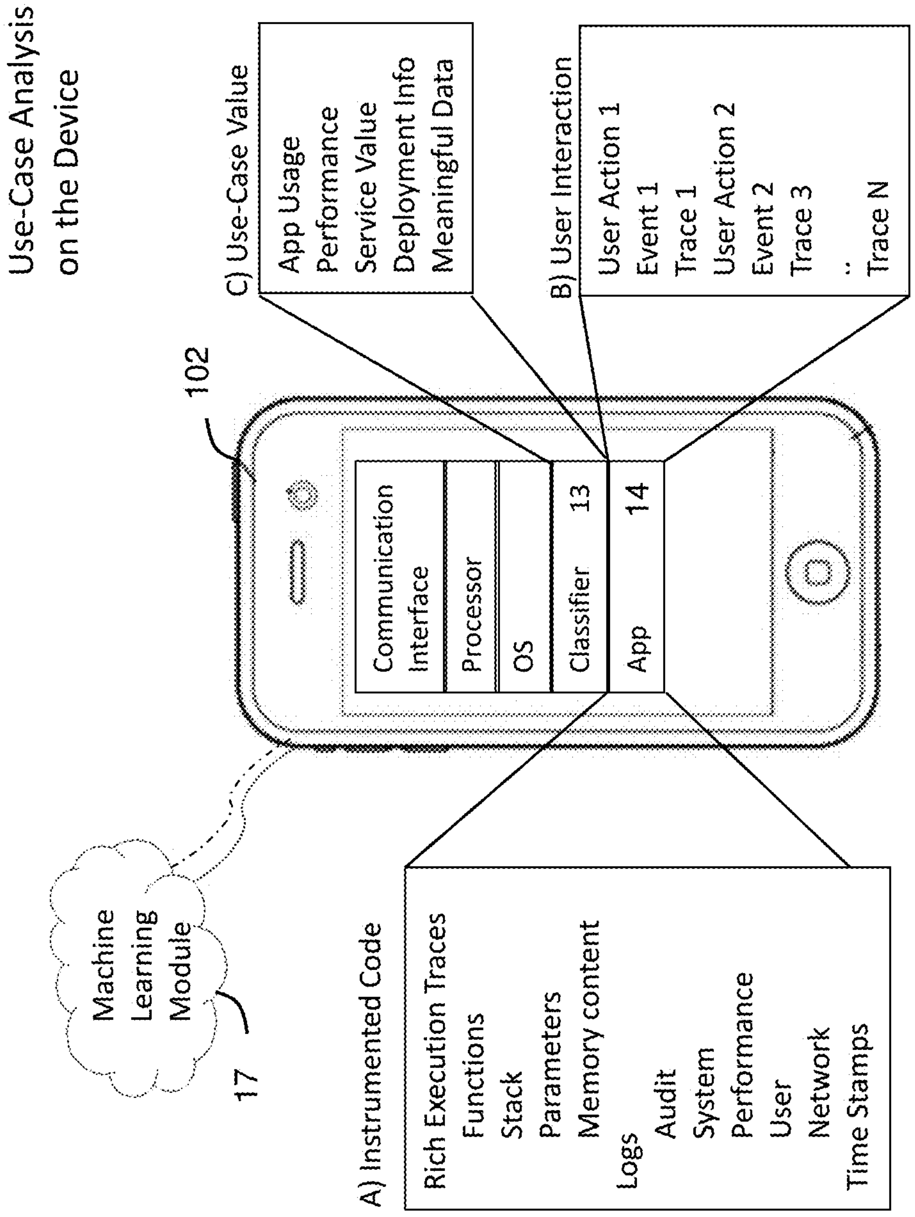
FIG. 1E illustrates a device for analyzing a usage of a product and/or software application in accordance with an embodiment.

Reverting briefly back to step 1, it was also previously mentioned that FIG. 1C illustrates an instrumented environment for generating trace information in accordance with an embodiment. Recall, instrumentation may also be performed at the environment level, by way of instrumenting the environment of the application. As one example, the environment of the application, which always also includes "service", is instrumented to funnel log and invocation information into a trace that will be used for analysis. The environment-based system shows a cloud environment instrumented to provide additional information. The labeled stars amongst the components shown denote sources for execution trace data, instrumented code to generate direct traces, harvesting of log data, monitor and record requests, and attach to communications. The instrumented environment includes a cloud load balancer 31 and associated Identity and Access Management (IAM) service components 41 communicatively coupled to one or more users through an Applications Programming Interface (API) 32 and respective APIs connected to back end services; for example, an Artificial Intelligence (AI)/Compute backend 35 and a cloud storage bucket/bin 36. The cloud load balancer 31 consumes and produces data that comes in via various applications and API gateways that also generate logs and other user and network environment related information. The information exchanged via the API along with the respective service uses can be analyzed, and with respect to network information, available through logs reporting various activities, including, but not limited to, load balancing.

The cloud load balancer 31 is a fully distributed, software-defined managed service that distributes user traffic and tasks across multiple instances of applications. By spreading the load, it reduces the risk that any particular application experiences limited performance issues. It can optimize the network response time and avoid unevenly applications overloading. The cloud load balancer 31 operates with the users via API requests. An API request usually involves oversight by one of the Identity and Access Management (IAM) service components, for example, who makes the request has appropriate permission to create, modify, or delete the associated resources. The instrumentation is applicable to the load balancer; that is, it may be instrumented to expose data relevant to use-case information, and moreover, as part of, or independent of machine learning classification.

The cloud load balancer 31 can be further configured by way of Identify and Access Management (IAM) Service Components. IAM refers to the structures and processes within an organization that administer and manager resources. These processes deal with network access rights, privileges, and group memberships. IAM is often deployed to reduce risk of data breaches, centralize access control, and lessen Information Technology (IT) workload. It streamlines the process of entirely managing user accounts, and provides benefits, such as improving user experience, network traffic and efficiency, flexibility and lowers operating costs. The IAM service components 41 include authentication services, authorization services, user management services and directory services. The authentication services can include single sign-on (SSO), multi-factor authentication (MFA), session and token management. The authorization services address roles, rules, attributes (e.g. metadata) and access privileges. The directory services include an identity store, directory federation, metadata synchronization, and virtual directory. The user management provides for provisioning and release of services, self-service, and delegation of actions and responsibilities.

As mentioned, various cloud components are instrumented for generating trace data, logs, records which are all harvested, monitored, and communicated to other components, including the reporting and analytics of the IAM service components 41. The instrumentation is applicable to all the services and models mentioned; that is, the services may be instrumented to expose data relevant to use-case information, and moreover, as part of, or independent of machine learning classification.

FIG. 1D depicts an exemplary communication environment 100 to analyze a usage of a use-case scenario in accordance with one embodiment. The environment 100 includes the use-case mapper 16, one or more ISVs 70, and user devices 102. The use-case mapper 16 can be managed directly by the ISV 70 as shown, or accessible over the network as shown. This allows the use-case recognition to be done on a cloud service of the ISV, whether by the ISV directly, or through another internet service. This environment may also be instrumented as previously described (e.g. see FIG. 1C: Configuration B: Instrumented Environment), hence, the cloud illustration designating it as an instrumented environment 18. Accordingly, it is useful for explaining the instrumented environment use cases.

As an example, for either configuration (e.g. Instrumented Environment vs. Instrumented Code/Device, or combination thereof) the ISV 70 provides a software application to the mobile device 102 to assess its usage. By way of the method steps described herein, for the configuration of Instrumented Code/Device) for example, once the user has downloaded the software program (instrumented to generate execution traces and capture use-case activities and events), the mobile device 102 can send reports on the user's use-case activity for the specific application. Notably, the "device" might just be a normal browser on a normal PC; for example, one that runs on the laptop 103 within the Wi-Fi zone. This provides the service provider insight into the user's needs, and which features are used or ignored, overall product usage evaluation, and how the user uses the application to perform a task within the environment. Alternatively, in the configuration for the Instrumented Environment, the use-case mapper 16 can analyze a software application running on the device, even it that device, is not running instrumented code. That said, the use-case mapper can execute both Instrumented Code configuration A on the device and also for the Instrumented Environment configuration B.

The communication environment 100 can include a telecommunication network 113 and an internet communication network (Internet) 120. The telecommunication network 113 can provide a mobile communication link via base receiver 110 for wireless connectivity of a mobile device 102 from one or more cells 107. In one arrangement, the mobile device 102 can communicate over a Radio Frequency (RF) link with the base receiver 110 using a standard communication protocol such as legacy 2G (CDMA, GSM) and 3G, or LTE 4G and 5G. The base receiver 110, in turn, can connect the mobile device 102 to the Internet 120 over a packet switched link. The internet can support application services and application service layers 150 for providing media or content to the mobile device 102. By way of the communication environment 100, the mobile device 102 can establish connections with a server/service 130 on the network and with other mobile devices for exchanging information or providing services such as audio, text messaging, media, audio, video, interactive applications, and the like. The server 130 can have access to a database that is stored locally or remotely and which can contain profile data. The server can also host application services directly, or over the Internet 120.

The mobile device 102 can also connect to the Internet over a Wi-Fi or WLAN 105. Wireless Local Access Networks (WLANs) provide wireless access to the mobile communication environment within a local geographical area. WLANs can also complement loading on a cellular system, so as to increase capacity. Wi-Fi is the wireless technology used to connect computers, tablets, smartphones and other devices to the internet. Wi-Fi is the radio signal sent from a wireless router to a nearby device, which translates the signal into data for the user of the mobile device 102. Wi-Fi is a family of wireless network protocols, based on the IEEE 802.11 family of standards, which are commonly used for local area networking of devices. WLANs are typically composed of a cluster of Access Points (APs) 104 also known as base stations. The mobile communication device 102 can communicate with other WLAN stations such as a laptop 103 within the base station area 105. In typical WLAN implementations, the physical layer uses a variety of technologies such as IEEE 802.11 technologies. The physical layer may use infrared, frequency hopping spread spectrum in the 2.4 GHz or 5 GHz Band, or sequence spread spectrum. The mobile device 102 can send and receive data to the server 130 or other remote servers on the mobile communication environment. In one example, the mobile device 102 can send and receive audio, video, or other multimedia content from the database through the server 130.

This communication environment 100 is also useful to illustrate and explain cases where an app on a device has been instrumented (e.g. see FIG. 1B: Configuration B: Instrumented Code/Device). In this case the use-case mapper 16 can analyze a software application running on the device, and compliance to device requirements (e.g. security sandboxes, performance, power management, memory, etc.). The use-case mapper 16 reports the use-case within communicatively coupled devices, for instance, over the telecom network infrastructure, within local Wi-Fi networks, in data centers, and in the cloud.

Referring now to FIG. 1E, the mobile device 102 for analyzing a usage of a product and/or software application is shown in accordance with Configuration B: Instrumented Code/Device (e.g. see FIG. 1B). The mobile device 102 is merely one example of a product used by a customer to consume a service. Again, the app may run on a browser on a laptop, or other device, as shown in FIG. 1D. Others are contemplated, for example, a computer, a server, a virtual machine, or even software modules configured to execute on a hardware processor, such as a browser or application. The major components of hardware and software associated with a software or product usage analysis are shown. Included, in common among contemplated devices, is a communications interface 11, a processor 12, and an operating system 13 to run one or more applications (apps) 14.

The use-case mapper 16 can capture and correlate the execution traces to a use-case scenario of the software program, for example, by assessing user interactions. The use-case mapper 16 classifies and reports a use of seen and unseen use-case scenarios by way of a classification model, for instance, regarding app usage, performance, service value, deployment information and meaningful data. The machine learning module 17 learns relationships between reference event traces and reference use-case scenarios to produce the classification model. It automatically adapts, updates and applies the classification model on unseen use-case scenarios based on the learned relationship.

The rich execution traces contemplated herein include not only standard traces (e.g. printfs, syslog, etc.), but may also include logging information and external event information. An external event may be one of a user event, a device event or an environmental event. A user event can include a user interface action or touch or other user action. A device event can include an abrupt movement or abrupt orientation or other device action. An environmental event can be a sound, a voice, a location, or image or other observable action.

Accordingly, the method includes capturing or detecting an event during a use-case among those of a user event, a device event or environmental event; generating execution traces responsive to capture or detection of the event; correlating the event to a user interaction step of the use-case scenario; and updating the learning on the use of expected, unexpected, seen, and unseen use-case scenarios in view of the event. For example, the instrumented app, can be configured to trigger the execution traces responsive to a detection of an acoustic sound event, a recognized voice, a location event, or a recognized camera image, or trigger on a device even, for example, one that may occur responsive to a user expressing satisfaction or frustration during a use-case.

It is also configured to record from the device, sounds from a microphone (for example to capture the user's voice or environmental sounds responsive to a use-case scenario), sights from a camera, coordinates from a location of the device by way of an internal measurement unit, and sensor information from a sensor of the mobile device to include as execution trace information for updated training by the machine learning module (e.g. temperature during use of an outdoor or indoor software application to assess user comfort with use-case scenario). By way of the instrumentation, the device is capable to trigger on registered user events, registered device events, and registered environmental events. The term "registered" when referring to events means an expressed interest within, for example, where a service provider registers a use-case action to trigger upon, for example, to learn more details about certain use-case activities. A triggering may be based on environmental sounds, user voices, specific words, device manipulations (jostle, shake, etc.), orientation ranges (tilted more/less than a specified degree), sensitivity bounds (e.g. based on IMU readings) and device/user locations (e.g. GPS location). Notably, the implementation of a triggering mechanism, if/when it occurs during a use-case, is merely another means for delineating and/or capturing "what" the user does on the device, and for assessing what "functionality" the user invokes.

A brief overview of terms used herein is now in order. The term "execution traces" means generally code level traces produced during code execution that include at least function method, stack, and heap information and data concerning the static or dynamic execution of the software program. It may also refer to logging information such as that related to the system, software, security, audit or user logs, whether captured on the device for Configuration A, or within the environment of the app for Configuration B. The term "use-case reference points" generally means (spatial or temporal) markers that segment user or device actions or environmental events during a usage, or use-case scenario. As an example, reference points may correspond with changes of the graphical user interface (e.g., button presses, screen changes, menu selections, pop-ups, prompts) during use, or physical actions on the device (e.g. detection of physical movement, acceleration, tilt) or environmental events (e.g. change of location, network activities, security messages, Wi-Fi communications, etc.) during use. The term "use-case scenario" is a general description of possible actions or interactions by a user with a device during its use, whether locally by the user using the device, or within the communication environment supporting the device (e.g. cloud balancer, IAM service components). A reference use-case scenario is used for learning, adapting or updating classification model. A known use-case scenarios is generally one used for training to learn a classification model. An unseen use-case scenario is one not already learned by training of the classification model. The term "uncorrelated" with respect to execution trace, or event trace, means a trace not, or not yet, associated with user interaction steps of a use-case scenario. A correlated trace is one associated with user interaction steps, for example, after segmentation of user interaction steps and mapping to execution traces.

The term "user interaction steps" are actions by the user during a usage of the device or application, including but not limited to, physical actions by the user on the device, such as touching, holding, pressing buttons, or those responsive to a user behavior, tapping, tilting, jostling, or shaking when using the device. The user interaction steps identify, and/or provide observation on, "what" the user does on the device or within an app or program thereon to provide an indication of the functionality the user invokes on the device, app or program. The term "event" generally means one of a user event, a device event or environmental event. The term "reference event traces" relates to execution traces coupled with one or more such events, usually those serving as a reference with respect to a baseline reference use-case scenario, locally with the user, or within the communication network supporting the device (.g. cloud balancer, IAM service components).

Classification is the task of assigning a class label to an input pattern; for example, a reference use-case scenario (where class labels correspond to user interaction steps) to reference event traces, where input pattern, for example, is a sequence of execution traces, or a coupled sequence of execution traces with logging information and event traces (user, device and/or environmental). The class label indicates one of a given set of classes. The classification is carried out with the help of a classification model obtained using a learning procedure. The learning may be by way of machine learning, artificial intelligence and/or deep learning, for example, but not limited to, neural networks, Bayesian classifiers, or other statistical pattern recognition systems.

The term "vectorization" means the conversion of an execution trace, event sequence, user interaction step, or other user, device or environmental event to a numeric vector for serving as an input pattern into machine learning, or for classification purposes. Vectorization is also extensible to include "event embeddings" which are a type of distance metric representations that allows events with similar activities/applications/uses to have a similar representation. As an example, a vectorization of user interaction steps for a similar purpose may include event embeddings associated with those steps, such that a vector produced by a first sequence of user steps to perform a device task, are closest in a distance measure (e.g. Euclidean, Hamming, Manhattan, L1 norm, L2 norm, log, exp, etc.) to similar vectorized user steps and vectorized events. Although not directly equivalent, it shares similarities with "word embeddings" used for natural language processing. A word embedding is a learned representation for text where words that have the same meaning have a similar numeric representation.

The term "normalizing" generally means scaling a vector to make it a unit vector (normalized elements of the vector), or a group of vectors to a unitary magnitude (normalized vectors of the vector group). The normalizing of vectors herein (e.g. execution trace vectors, user-case vectors, and/or event vectors) preserves the direction component of the vector with respect to the vector grouping with diminished emphasis on the individual magnitude components. The normalizing of vectors provides for a numeric boundary on the input limit to machine learning; that is, it scales the vectors to be within computationally normal or regular limits.

Figure 2A:
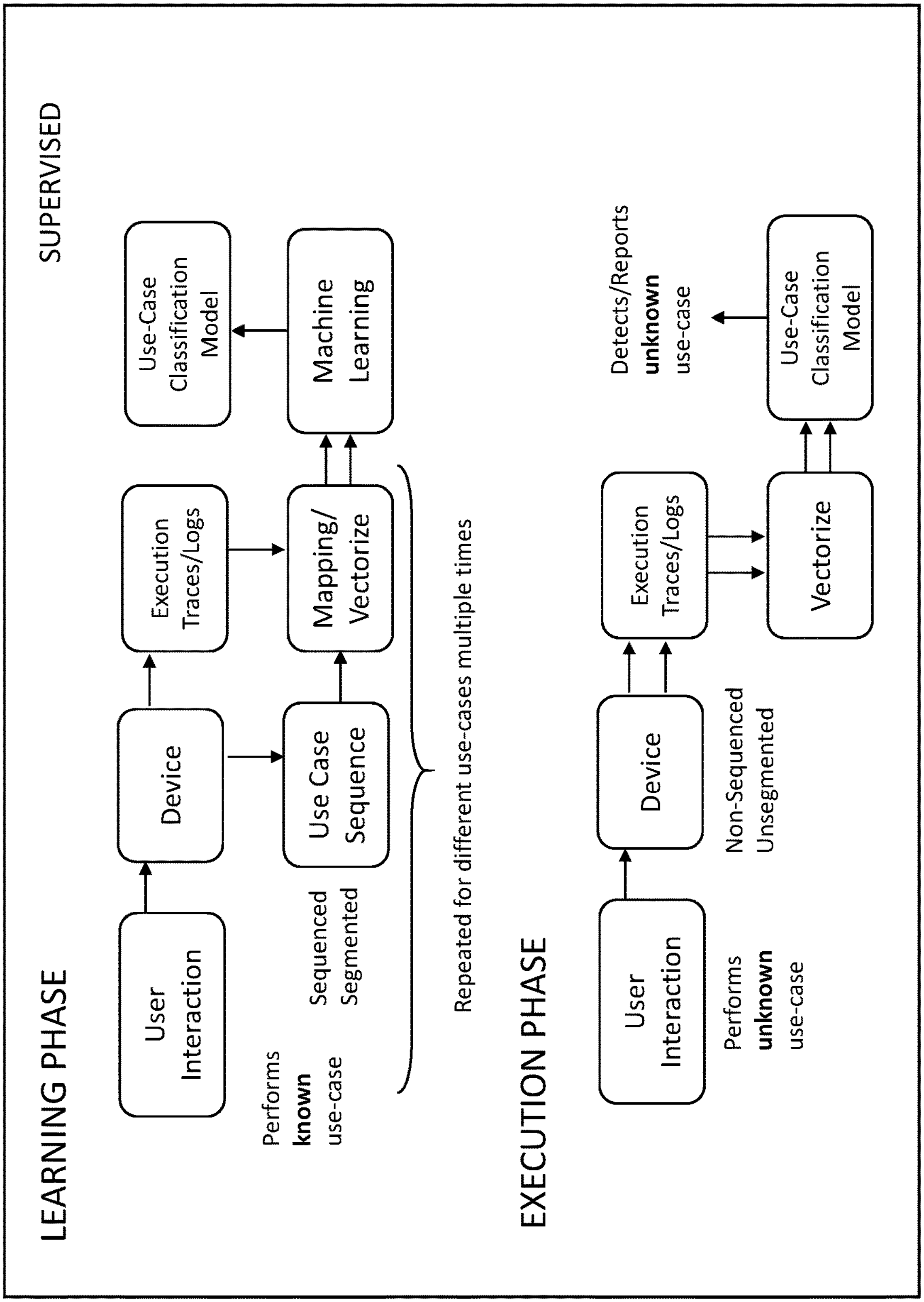
FIG. 2A depicts block diagrams for a learning phase and an execution phase for product use analysis by way of supervised machine learning.

FIG. 2A depicts block diagrams for a learning phase and an execution phase for product use analysis by way of supervised machine learning. Briefly, supervised learning is the machine learning task of learning a function that maps an input to an output based on example input-output pairs. It infers a function from labeled training data consisting of a set of training examples. In supervised learning, each example is a pair consisting of an input object and a desired output value. A supervised learning algorithm analyzes the training data and produces the classification model, which can be used for mapping new examples.

In the learning phase, a training set is used to build up and teach the classification model to yield the desired output. This training dataset includes inputs and correct outputs, which allow the model to learn over time. Here, the input used for training in the learning phase is originally generated by the user interaction on the device when performing known, or reference, use-cases. As an example, the user is presented with a use-case to follow as part of a training exercise. A user interface module presents the user with a reference use-case scenario consisting of a sequence of interaction steps (user or network) to follow by way of the software application. The series of user interaction steps is sequenced and segmented as an output vector called the use-case vector; that is, it is vectorized. A corresponding series of execution traces is mapped to this series and segmentation of user interactions and is also vectorized; it is called the execution trace vector.

The execution trace vector is the input, and the use-case vector is the output to the machine-learning module. As input data is fed into the classification model, it adjusts its weights until the classification model has been fitted appropriately, which occurs as part of a cross validation process through a learning algorithm (e.g., backpropagation learning). This process is repeated multiple times for known different reference use-cases to train the classification model. The algorithm measures its accuracy through a loss function during this repeated presentation of input and output vectors, and adjusting until the error has been sufficiently minimized. The classification algorithms may be one of linear classifiers, support vector machines (SVM), decision trees, k-nearest neighbor, and random forest.

Stronger deviation of a received execution trace from an already known trace is used to recognize new uses of the system and indicate an opportunity to enhance the use case recognition system with new use cases. Nearest neighbor search (NNS), as a form of proximity search for such recognition tasks, and which is also related to vectorization, is the optimization problem of finding the point in a given set that is closest (or most similar) to a given point. Closeness is typically expressed in terms of a dissimilarity function: the less similar the objects, the larger the function values. K-nearest neighbor, k-means clustering or binary split KNNs can be employed for higher dimensional searching using mathematically tractable solutions, which can include building index structures that narrow down the vector search space. A related approach is product quantization, which splits the vectors into products of lower-dimensional spaces. Yet another is locality-sensitive hashing, which uses hash functions to group similar vectors together. These approaches index the centroids or buckets. As part of, or apart from, the search into the reference database 320, the results of the search are ranked according to likelihood, probability, or other machine learning based distance metrics between vectors (e.g., Euclidean distance, Hamming, Cosine similarity, etc.). The Neighbor search (NNS) is used as the basis for creating the vector space encompassing the three vectors used in the Artificial Neural Network (ANN) topologies described ahead.

Once the classification model has been sufficiently trained, usually when a desired error for input/output vector epochs (pairs, group, etc.) is below a threshold, the classification model can be applied to unseen use-cases. In the execution phase, the user interaction of an unknown (or unseen) use-case is similarly decomposed into a use-case vector and an execution trace vector, but only the latter is vectorized. That is, as seen in the depiction shown, the use-case steps in the execution phase are neither mapped nor vectorized. This is because there already exists direct correspondences with execution traces to user interaction steps by way of the instrumented code, and because on unknown use-cases there is no apriori sequencing and segmentation of the user interactions, as was performed in training. However, other embodiments herein also provide for vectorizing and using the use-case scenario (non-sequenced and unsegmented) and using it as supplemental input to the classification model in the execution phase. In that case, the input for classification comprises a coupling of the execution trace vector with a non-sequenced and unsegmented use-case vector. The execution traces are vectorized and fed as input to the classification model, which then detects and reports the unknown use case.

Figure 2B:
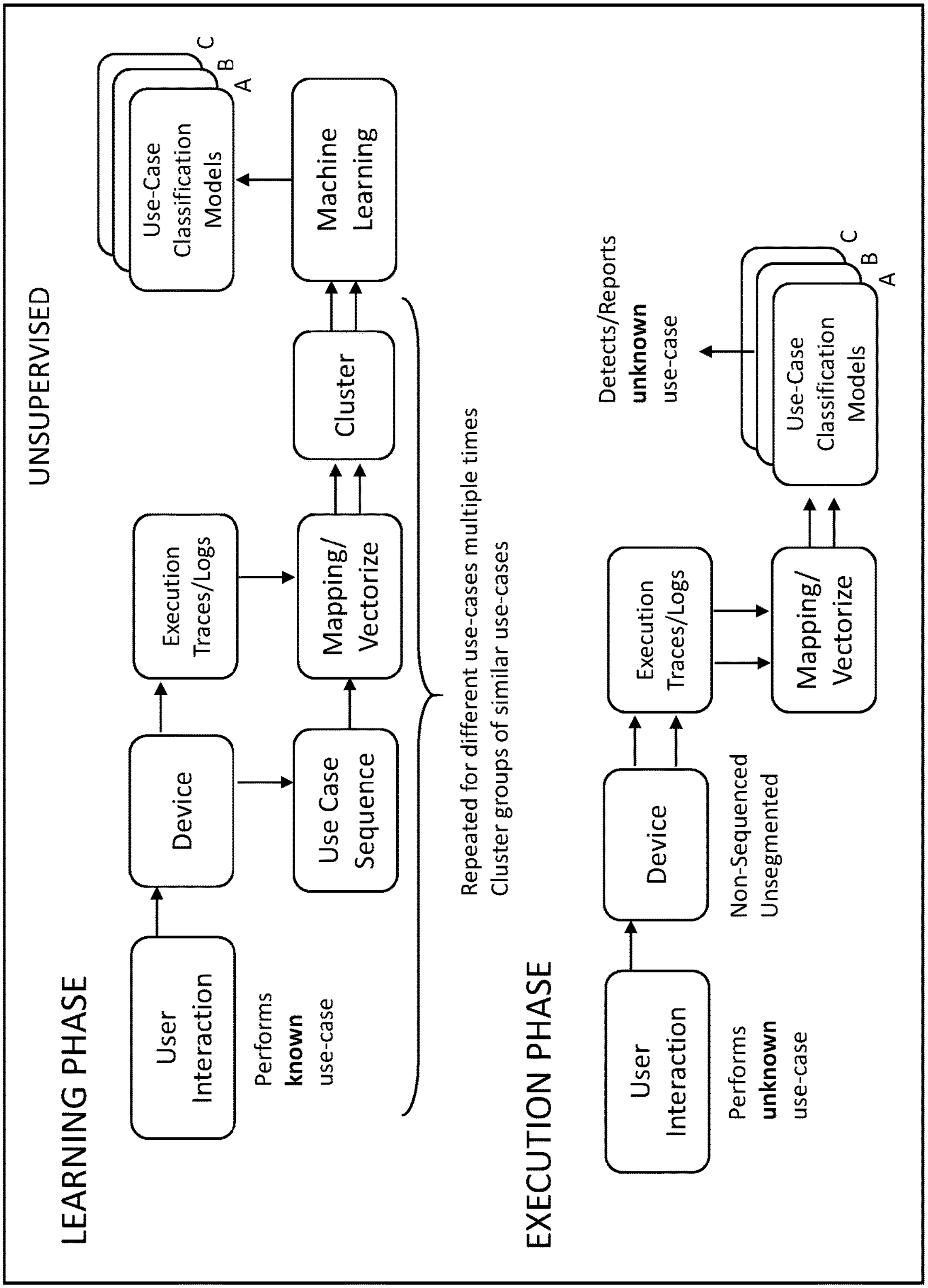
FIG. 2B depicts block diagrams for a learning phase and an execution phase for product use analysis by way of unsupervised machine learning.

FIG. 2B depicts block diagrams for a learning phase and an execution phase for product use analysis by way of unsupervised machine learning. Unsupervised learning is a type of algorithm that learns patterns from untagged data. The machine is forced to build a compact internal representation of its world and then generate imaginative content from it. In contrast to supervised learning where data is tagged by an expert, unsupervised methods exhibit self-organization that captures patterns as probability densities or a combination of neural feature preferences. In the learning phase, the unsupervised network tries to mimic the data it's given and uses the error in its mimicked output to correct itself; that is, correct its weights and biases. In contrast to the supervised method's use of the backpropagation error minimization metric, unsupervised learning also employ other methods including: Hopfield learning rule, Boltzmann learning rule, Contrastive Divergence, Wake Sleep, Variational Inference, Maximum Likelihood, Maximum A Posteriori, and backpropagating reconstruction errors or hidden state reparameterizations.

As seen in the figure, the unsupervised learning phase includes a clustering approach, whereby similarly related reference use-case scenarios are partitioned according to a use case. For example, individual use-cases associated with device settings are clustered into respective groups (e.g., settings panel on mobile device for: phone, network, messages, or browser) and further classified into sub-clusters (e.g., contacts, passwords, calls, blocking, etc.). The user interaction steps are associated with a clustered use-case scenario. Similarly, once vectorized, the clustered interaction steps will be used as input for the system to learn relationship with the respective clustered reference event traces (execution traces plus optional external events). Accordingly, there will be multiple classification models (e.g. A, B, C). Once the classification models have been sufficiently trained, usually when a desired error for input/output vector epochs (pairs, group, etc.) is below a threshold, the classification models can be individually applied to unseen use-cases.

The execution phase is similar in practice to the supervised case, but uses multiple classification models. The user interaction of an unknown (or unseen) use-case is similarly decomposed into a use-case vector and an execution trace vector. The execution traces are vectorized and separately fed as input to the classification models (A, B, C), and the model with the best fit (e.g. lowest classification error) is selected as the one matching the use-case scenario. All the information is sent and reported to a backend service provider to report on the use-case scenario.

Figure 3A:
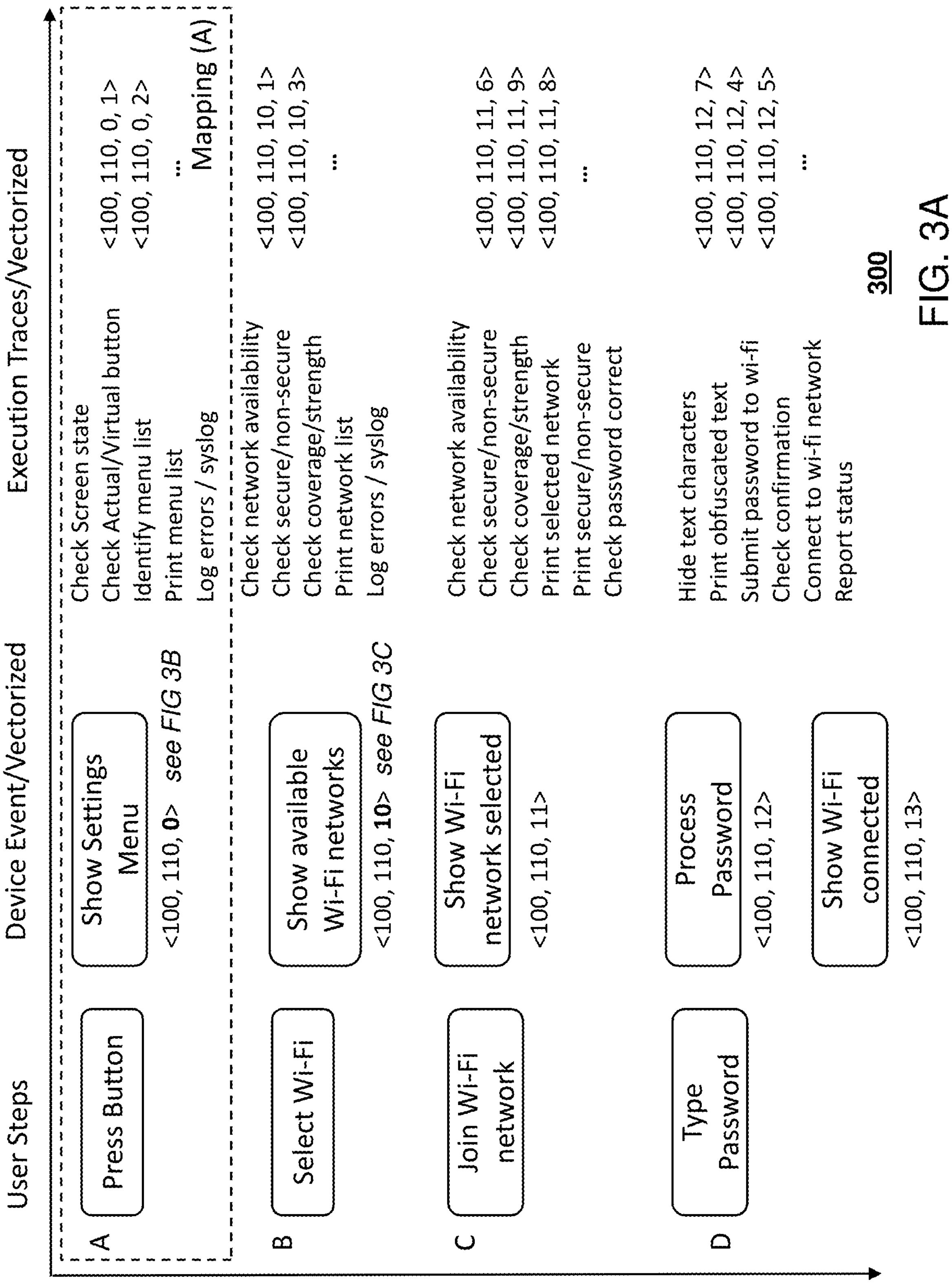
FIG. 3A a flowchart depicts an exemplary use-case scenario of the mobile device for reporting a use-case analysis in accordance with an embodiment.

Referring to FIG. 3A a flowchart depicts an exemplary use-case scenario of the mobile device 102 for reporting a use-case analysis. It is applicable for both the learning phase and the execution phase described above. When referring to the flowchart, reference will also be made to FIGS. 3B-3C which show exemplary screen shots for a particular user interaction step of the use-case scenario. In this example, the use-case is for searching and joining a Wi-Fi network. Understandably, other use-case scenarios are similarly applicable. It should provide the reader with a better understanding and interpretation between user actions, device events, execution traces and vectors. As shown, the flowchart identifies the user steps, corresponding device events with vectorized examples, and corresponding execution traces with vectorized examples.

Figure 3B:
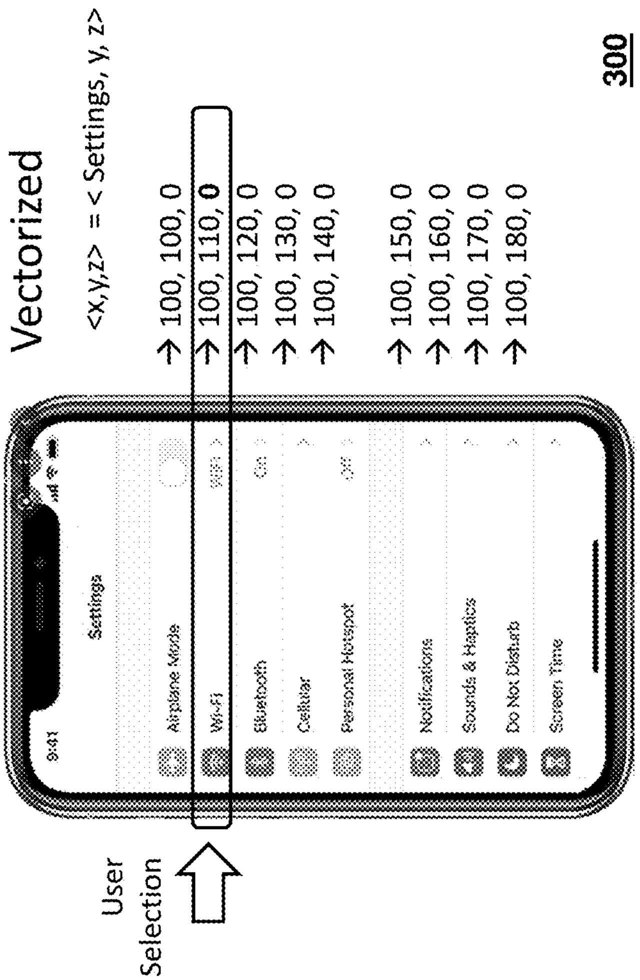
FIG. 3B depicts an example user step of a use-case scenario in accordance with an embodiment.
Figure 3C:
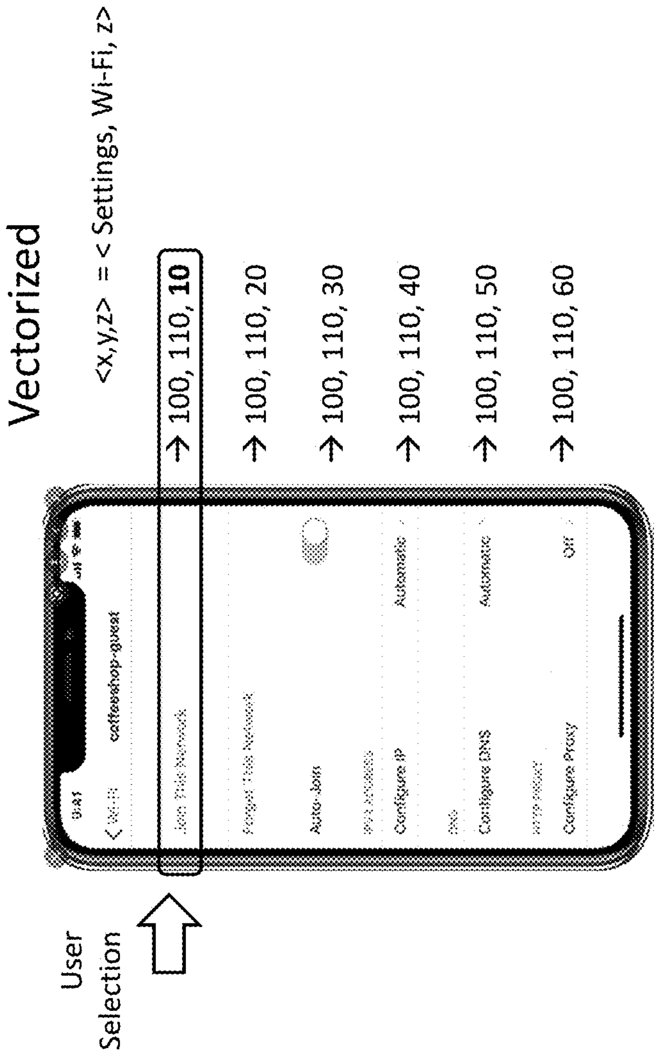
FIG. 3C depicts another example user step of a use-case scenario in accordance with an embodiment.

In the learning phase, the user follows the presented steps on the mobile-device. Notably, the user is not restricted to being the customer or device owner in this phase. For instance, they may be a test engineer, development engineer, or a beta user who is presented with a reference Wi-Fi use-case through the (instrumented) App. The user will follow the presented steps and repeat the entire action for various multiple reference use-cases during the learning phase. In both the learning phase and the execution phase the App captures and maps the user's sequence of interactive steps (user and/or network) on the device and generates execution traces for each step similarly. For example, at step A, shown in the $1^{st}$ column, the user presses the button. The device responds with a "show settings menu", as seen in the $2^{nd}$ column. The device event is vectorized <100, 110, 0> as also seen in FIG. 3B. The App captures execution traces on the device corresponding with this step. As seen in the $3^{rd}$ column, a list of example execution traces and vectors are shown. This user step with corresponding device event is mapped to the execution traces. Similarly, at step B, the user selects the Wi-Fi option, to which the device responds with a showing of available networks from which to choose. The device events are vectorized as also seen in FIG. 3C. The user continues with the presented use-case as see in steps C and D.

For each use-case step, the App maps the sequence of steps to device events and execution traces. The App vectorizes the use-case sequence steps and the associated execution traces. In the learning phase, the App sends the vectorized information to the machine learning module 17 for learning the reference use-case scenarios. Once trained, the classification model resides on the mobile-device, or is invoked remotely in the cloud. Thus, in the execution phase, the app can vectorize an unseen use-case and proceed with classification for use-case analysis on the mobile device or in the cloud. This serves as evidence on whether the customer completed use-cases, confirmed if all use-case steps completed, and provides for collection of meaningful use information (real-time, in-field, on-premise).

By way of example of FIG. 3A, a method for analyzing a usage of a software application by a user has been provided. It comprises instrumenting the software application to generate execution traces at use-case reference points; presenting the user with a reference use-case scenario to follow by way of the software application; capturing the execution traces during user interaction with the software application during the reference use-case scenario; correlating the execution traces to a sequence of interaction steps of the reference use-case scenario; repeating the steps of presenting, capturing and correlating for multiple reference use-case scenarios; producing reference event traces with reference use-case scenarios for input to a training process of the classification model that maps presented reference use-case scenarios to known use-case scenarios; and learning a classification model for the execution traces from the repeating; and thereafter the learning, applying the classification model to uncorrelated execution traces to report a use of the app. It may include steps of detecting an event during an unseen use-case among those of a user event, a device event or environmental event; generate execution traces responsive to the detection of the event; capturing and correlating the event to a user interaction step of the use-case scenario; and updating the learning and reporting on the use of unseen use-case in view of the event.

Figure 4:
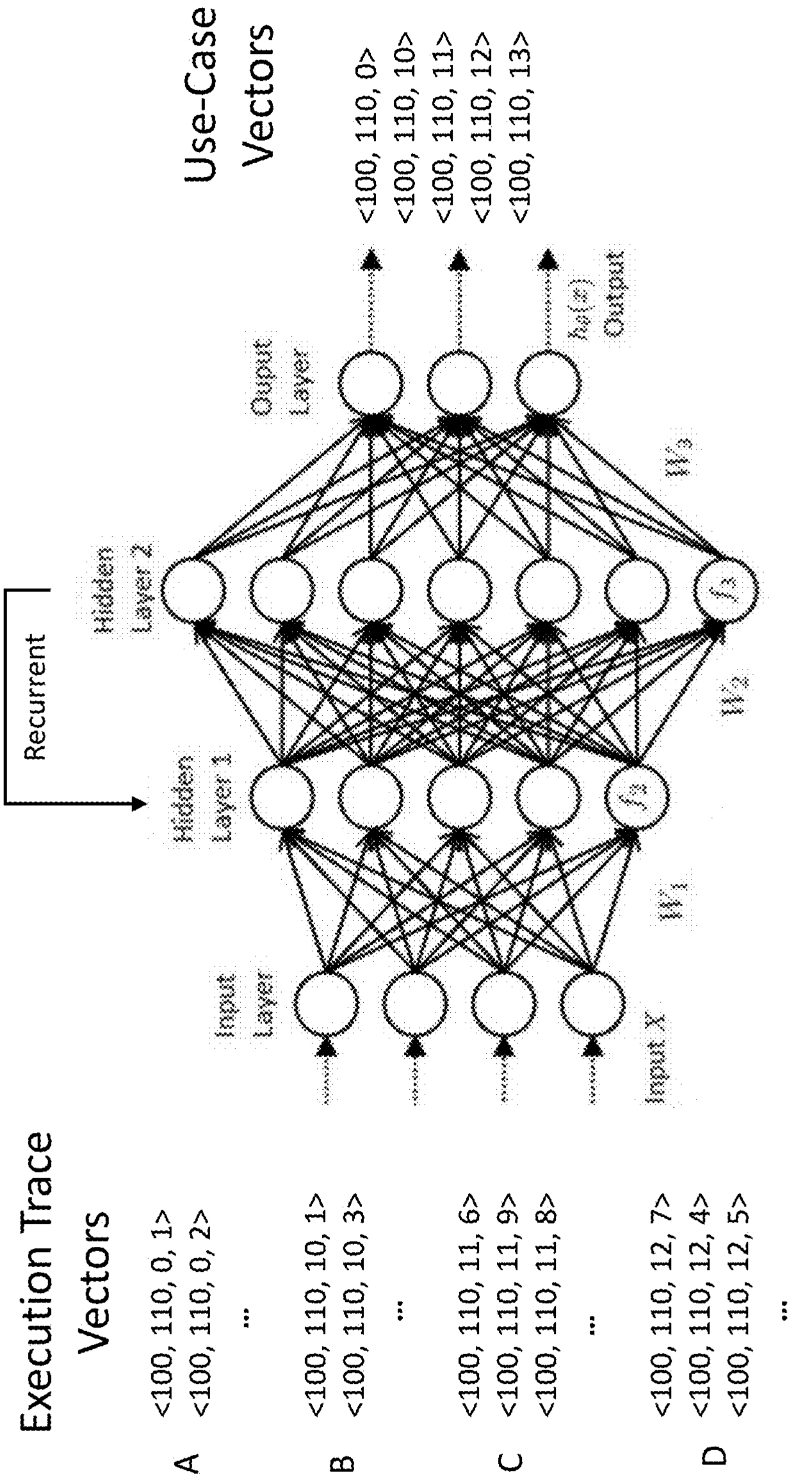
FIG. 4 illustrates a generic lattice structure of an artificial neural network (ANN) in accordance with an embodiment.

FIG. 4 shows a generic lattice structure of an artificial neural network (ANN) used by machine learning. An ANN is based on a collection of connected units or nodes called artificial neurons, which loosely model the neurons in a biological brain. Each connection, like the synapses in a biological brain, can transmit a signal to other neurons. An artificial neuron receives signals then processes them and can signal neurons connected to it. The "signal" at a connection is a real number (hence the numeric vectors), and the output of each neuron is computed by some non-linear function of the sum of its inputs. The connections are called edges. Neurons and edges typically have a weight that adjusts as learning proceeds. The weight increases or decreases the strength of the signal at a connection. Neurons may have a threshold such that a signal is sent only if the aggregate signal crosses that threshold.

The topology in supervised learning is the fully connected, three-layer, feedforward network (see Backpropagation, Radial Basis Function Networks). All input values to the network are connected to all neurons in the hidden layer, the outputs of the hidden neurons are connected to all neurons in the output layer, and the activations of the output neurons constitute the output of the whole network. As shown, the execution trace vectors are provided as input and the use-case vectors are provided as output for the learning phase. In other configurations, the execution trace vectors can be coupled with the use-case vectors to learn other input/output relationships. Execution traces and user interaction steps can be sent to a back-end server for storage and for performing the learning by way of a machine-learning algorithm. Execution traces are automatically matched with reference use-case scenarios in a training process by the machine learning. The machine learning associates an execution of the software application with at least one use-case scenario where a classification error is below a pre-established threshold. The machine learning associates an execution of the software application with at least one use-case scenario where a classification error is below a pre-established threshold.

Figure 5:
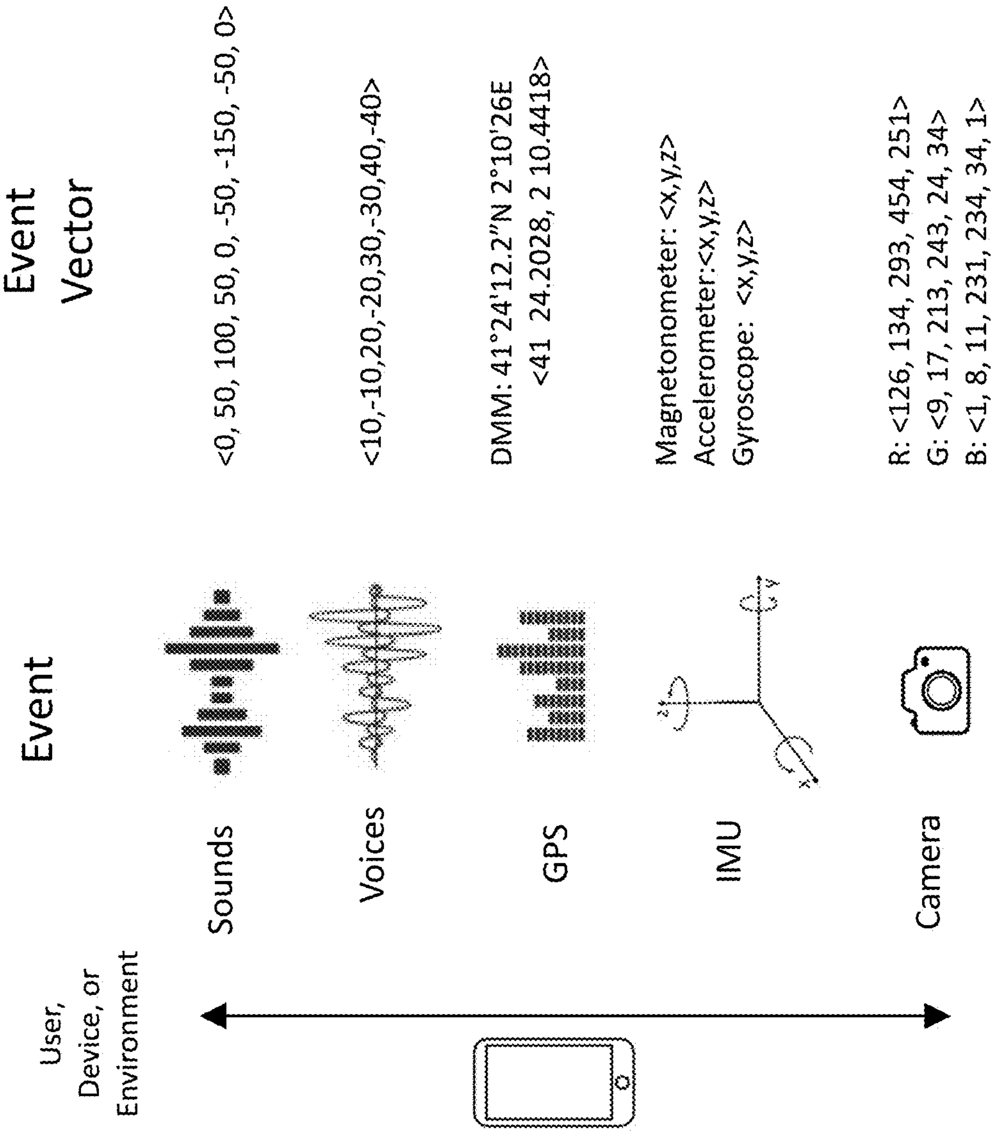
FIG. 5 illustrates vectorization of external events captured, or configured as triggering events, of a use-case scenario in accordance with an embodiment.

Moreover, as previously mentioned, the execution traces may also include external events, which are similarly vectorized. FIG. 5 illustrates vectorization of various external events (e.g., sounds, voices, location, tilt, orientation, images) which may be captured, or configured as triggering events, of a use-case scenario. Furthermore, metadata can be collected and associated with the software application or events during user interaction with the software application during a use-case scenario. The metadata can be included within the learning of the classification model. The instrumented software application can be deployed with a package comprising algorithms of a machine learning classification model to report the use of the use-case scenario continually in real-time. The fully automatic injection of (execution) trace generating code including relevant data allows for detection, at anypoint in time, of new use cases from these (execution) traces without the need of redeploying the application.

The generic instrumentation is quickly performed, such that over time, more and more use cases can be taught to the use-case recognition system (classification model). This provides for fast time to market and allows for system improvement at any point in the product lifecycle, without the need to redeploy the software application. As one example, binary rewriting adds automatic license verification to an application, without the user needing to implement the API calls themselves. Metadata is included that comprises information about the software license, and may consist of at least one among timestamps, access permissions, and number of runtime allowances. Thereafter, a trained classification model can detect and report a software license issue with the software application during a use case scenario, and/or update the classification model accordingly upon analysis of the reported use-case information.

Another deep Learning algorithm is the Convolutional Neural Network (CNN). It is more often used to analyze imagery. It can take as input an image, assign an importance (e.g., learnable weights and biases) to various aspects and objects in the image, and then differentiate one image from another. CNNs are a specialized type of neural network that uses convolution in place of general matrix multiplication in at least one of their layers, mostly used in image recognition and processing specifically designed to process pixel data. It too consists of consists of an input layer, hidden layers and an output layer. The pre-processing required in a CNN is much lower as compared to other classification algorithms. Convolutional layers convolve the input and pass its result to the next layer. This is similar to the response of a neuron in the visual cortex to a specific stimulus. Each convolutional neuron processes data only for its receptive field.

Briefly, for an image represented by Red, Green, Blue (RGB) vector components, each vector may correspond to a receptive layer of the CNN. As the pixel resolution (bit-level) increases and the image resolution as established by the number of pixels increases, processing becomes computationally burdensome. The CNN is especially configured to reduce the images into a form which is simpler to process without sacrificing feature reduction while maintaining its ability to discriminate and classify images. Convolution operations are provided by way of a kernel that filters across dimensionalities (e.g., x,y,z) to extract high-level features such as edges. Each layer in the CNN may employ a specific kernel for a particular purpose, such as, gradient, color, orientation, etc.

In a manner similar to how a CNN learns relations among the color mixing model of RGB pixels by way of a 3D kernel filter in an image, here, the relation of the execution trace embedding vectors and use-case vectors can be learned by way of a 2D kernel filter. In one case, there are two vector sets; for example, execution trace vector for R pixels, and use-case vector for G pixels. Lower-level execution trace embedding vectors can also be further extracted and treated as a 3 rd pixel vector; for example, the B component of RGB. In yet another embodiment, the third vector component can be external events (e.g. sensor patterns), for example, sounds from a microphone of the device, sights from a camera of the device, coordinates from a location of the device, and temperature information from a sensor of the device. These sensor patterns correlate to specific user steps of the use-case scenario, analogous to how the execution traces correlate to those same specific user steps As a CNN extracts/learns the relations between the three (3) RGB pixel vectors, so too does a CNN trained on three event vectors (execution trace vector, use-case step sequence vector, and the sensor pattern event vector). In one configuration, these 3 vectors are normalized, based on a pre-computed vector spaces that assigns a weighting to use-case steps, such that they are additive based on use-case scenarios; in effect compressed to an RGB color scale. Just as an RGB color model is an additive color model where red, green and blue are added together in various ways to reproduce and represent a pallet of colors. Analogously, the vectorization and normalizing is performed in a manner to allow for vector addition to reproduce a pallet of use case scenarios. Recall, the Neighbor search (NNS) mentioned above is used in one embodiment as the basis for creating the vector space encompassing the three vectors. Analogous to the three R,G,B additive vectors for modeling human perception of color, the vectorized and normalized execution traces are achieved for modeling use-case perception.

Another topology is that of the recurrent neural network (RNN), which includes recurrent loops to capture long-term dependencies while learning from sequential data. This is suitable for use-case analysis because of the sequencing and ordering of user interaction steps and mapped associations to execution trace vectors. The RNN is trained on input combinations of the execution trace vector, use-case step sequence vector, and the (sensor pattern) event vector. It learns the probabilities of the use-case step sequences for observed execution traces and/or event vectors. Over time, it automatically updates through presentation of use-case scenarios to more accurately produce use-case results. A sensitivity analysis of the recurrent model is configured to determine a weight of each execution trace in the reference use-case scenarios, wherein the sensitivity analysis model classifies each execution trace, or group of execution traces, associated to a reference use-case scenario as a main or an auxiliary event trace, or group thereof, according to their weight. In one arrangement, the ANN lattice is restructured as a convolutional network configured (CNN) with recurrent loops to provide for learning of spatial and temporal dependencies. The recurrent aspect provides for modeling of the ordering of user interaction steps of a use-case scenario, and in conjunction with the CNN to view the use-case interaction as humans do, and to perceive it in a similar manner.

Figure 6:
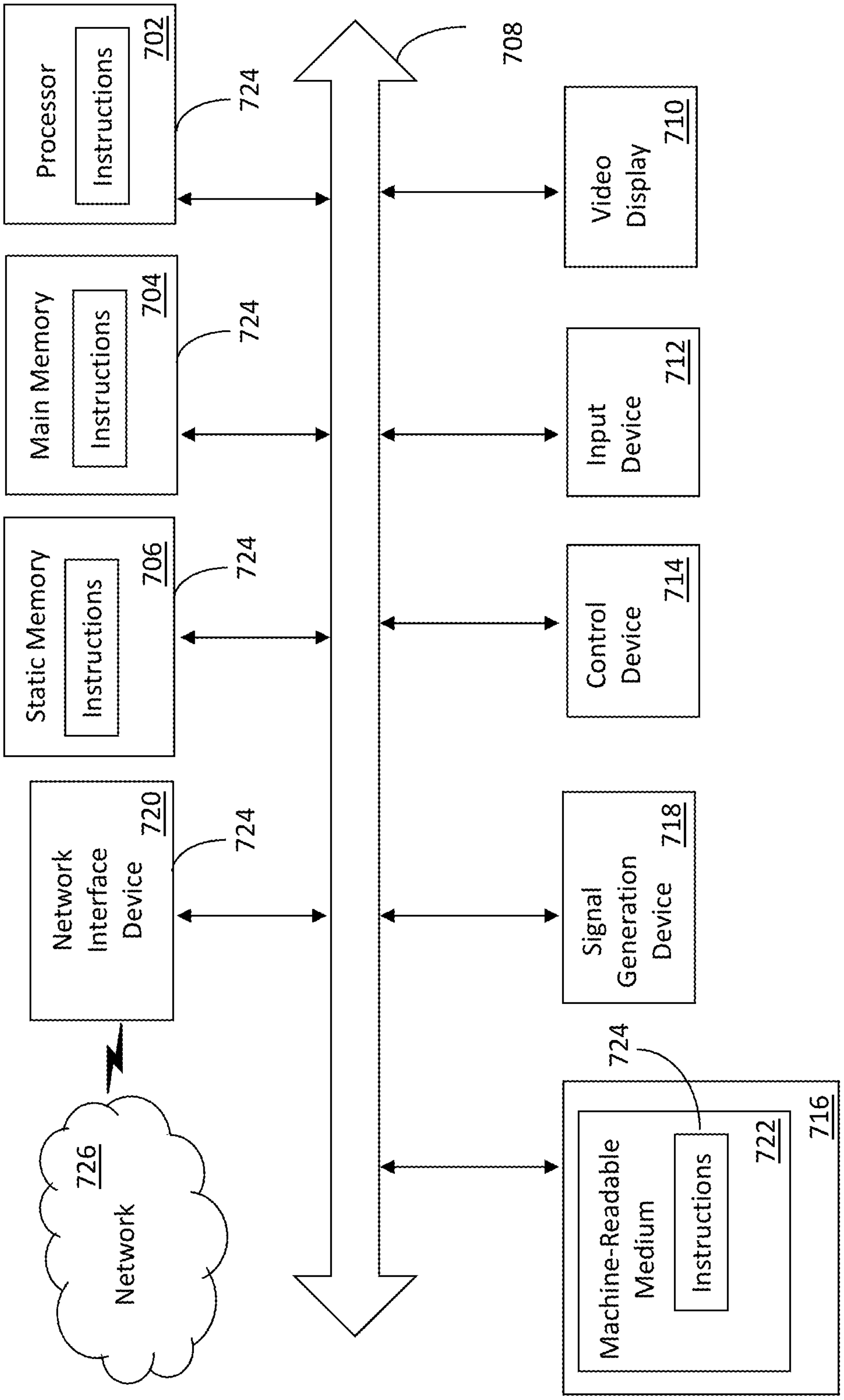
FIG. 6 depicts an exemplary diagrammatic representation of a machine and hardware platform suitable for use to perform the methods in accordance with an embodiment.

FIG. 6 depicts an exemplary diagrammatic representation of a machine 700 and hardware platform suitable for use to perform the methods and steps disclosed herein, and in accordance with various embodiments. The machine 700 is shown in the form of a computer system 700, within which a set of instructions, when executed, may cause the machine to perform any one or more of the methodologies discussed above. In some embodiments, the machine operates as a standalone device, such as a computer, laptop, mobile device, remote control, or display. In some embodiments, the machine may be connected over the network to other machines. In a networked deployment, the machine may operate in the capacity of a server or a client user machine in server-client user network environment, or as a peer machine in a peer-to-peer, or distributed, network environment.

The machine may comprise a server computer, a client user computer, a personal computer (PC), a tablet PC, a laptop computer, a desktop computer, a mobile device, a cell phone, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 700 may include a processor 702 (e.g., a central processing unit (CPU), a graphics processing unit (GPU, or both), a main memory 704 and a static memory 706, which communicate with each other via a bus 708. The computer system 700 may further include a video display unit 710 (e.g., a liquid crystal display or LCD), a flat panel, a solid state display, or a cathode ray tube (CRT)). The computer system 700 may include an input device 712 (e.g., a keyboard, touchless sensing unit 110), a cursor control device 714 (e.g., a mouse, touchless sensing unit 110), a disk drive unit 716, a signal generation device 718 (e.g., a speaker or remote control) and a network interface device 720.

The disk drive unit 716 may include a machine-readable medium 722 on which is stored one or more sets of instructions (e.g., software 724) embodying any one or more of the methodologies or functions described herein, including those methods illustrated above. The instructions 724 may also reside, completely or at least partially, within the main memory 704, the static memory 706, and/or within the processor 702 during execution thereof by the computer system 700. The main memory 704 and the processor 702 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

While the machine-readable medium 722 is shown in an example embodiment to be a single medium, the term "machine-readable medium" should be taken to include a single medium or multiple media (e.g., a centralized or distributed database, and/or associated caches and servers)

that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

OTHER EMBODIMENTS

In one embodiment, a computer-implemented method for analyzing the usage of a software application provided by a software vendor is provided. The method comprises the steps of: providing a code profiler with a profiler function, this profiler function comprising information associated with events produced while executing the application in order to generate event traces, instrumenting the software application with the code profiler, executing the instrumented software application and capturing, by the code profiler, the generated event traces in response to information associated with events that satisfy the profiler function, providing at least one set of pre-generated event traces, wherein each set of pre-generated event traces corresponds to at least one usage scenario, and comparing the generated event traces while executing the application with each of the sets of pre-generated event traces and associating the execution of the application with at least one matched usage scenario.

At least one set of pre-generated event traces corresponding to different usage scenarios are pre-classified using machine learning techniques, the algorithms of this machine learning classification model being tuned-up by automatically matching sets of reference event traces with reference usage scenarios in a training process. The code profiler is configured to send the generated event traces to a back-end server implementing the machine learning classification model and storing the sets of pre-generated event traces corresponding to usage scenarios, wherein this back-end server is configured to receive the generated event traces, comparing them with each of the sets of pre-generated event traces and automatically associating the execution of the application with at least one usage scenario in case the sampling error is below a pre-established threshold. The generated event traces while executing the application further train the algorithms of the machine learning classification model at the back-end server, this machine learning classification model being used to update a sensitivity analysis model configured to determine the weight of each event trace in the reference usage scenarios.

The sensitivity analysis model classifies each event trace, or group of event traces, associated to a reference usage scenario as a main or an auxiliary event trace, or group thereof, according to their weight, wherein if, as a result of the updated sensitivity analysis model based on the generated event traces, any event trace, or group of event traces, associated to a reference usage scenario modifies their weight so as to change their classification to main or auxiliary event trace, or group thereof, the profiler function of the code profiler is updated accordingly. The generated event traces of the application further comprises metadata about the license account executing the application, timestamps, its access permissions, and/or number of runtimes per specific time such as hour, day, week, wherein the comparison of the generated event traces with the sets of pre-generated event traces is also based on this metadata and pre-generated metadata, accordingly. The code profiler may be a binary application and the profiler function uses binary rewriting techniques to add stubs to the source code of the software application for declaring themselves at the occurrence of the events produced while executing the application and thus retrieving the generated event traces. The machine learning classification model is configured to automatically match sets of reference event traces with reference usage scenarios in a training process.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized.

What is claimed is:

1. A computer implemented method for analyzing a usage of an application provided by a software vendor, wherein the method, that by way of a computer comprising one or more hardware processors and a memory coupled to the one or more hardware processors, wherein the memory includes computer instructions which when executed by the one or more hardware processors causes the one or more hardware processors to perform the method, comprises steps of:

automatically instrumenting the application by way of binary instrumentation that modifies executable binary code of the application to insert trace-generating stubs into the executable binary code of the application, without modifying source code of the application and without implementing Application Programming Interface (API) calls, to generate execution traces at use-case reference points, wherein the execution traces comprise function, method, stack, and heap information concerning the application with respect to a sequence of interaction steps, thereby automatically generating relevant information by the application itself;

capturing said execution traces during a user interaction with the application during a use-case scenario;

collecting metadata associated with said application and events during the user interaction with the application during said use-case scenario, wherein the metadata is automatically generated by the application itself by way of the binary instrumentation;

including said metadata within a classification model, wherein said metadata comprises information about a software license and about a license account executing the application, and wherein said metadata comprises information about said software license consisting of at least one among timestamps, access permissions, and number of runtime allowances;

applying the classification model to uncorrelated execution traces to report a use of unseen use-case scenarios, wherein the uncorrelated execution traces of the application due to the binary instrumentation detect activities of the application with respect to authentication services for single sign-on (SSO) and authorization services to address the metadata and access privileges, wherein said authorization services evaluate roles, rules, and attributes comprising said metadata and enforce said access privileges associated with said software license; and detecting and reporting a software license issue with said application during said use case scenario for said events and said unseen use-case scenarios, thereby providing to an Independent Service Vendor (ISV) associated with the application, a measure of value that a user receives for said software license from using the application with said authentication and authorization services.

2. The method of claim 1, further comprising:

presenting the user with a reference use-case scenario to follow by way of the application;

correlating said execution traces to a sequence of interaction steps of said use-case scenario;

repeating said steps of presenting and capturing for multiple use-case scenarios;

producing reference event traces with reference usage scenarios for input to a training process of said classification model to map presented reference use-case scenarios to known use-case scenarios; and updating a learning of said classification model for said execution traces from said repeating and producing.

3. The method of claim 2, further comprising:

detecting an event during a use-case among those of a user event, a device event or environmental event;

generating execution traces responsive to said detection of said event;

capturing and correlating said event to a user interaction step of said use-case scenario; and updating said learning on said use of said use-case in view of said event.

4. The method of claim 3, further comprising:

detecting multiple events during a same user interaction step; and differentiating between said multiple events, wherein a user event comprises at least one among a user interface action or touch, a device event comprises at least one among an abrupt movement or abrupt orientation, an environmental event comprises one among a sound, a voice, a location, or image.

5. The method of claim 4, further comprising sending said execution traces and said user interaction steps to a back-end server for storage and for performing said learning by way of a machine learning algorithm; and matching sets of execution traces automatically with reference use-case scenarios in a training process by said machine learning.

6. The method of claim 5, wherein the machine learning associates an execution of the application with at least one use-case scenario where a classification error is below a pre-established threshold.

7. The method of claim 6, further comprising updating a sensitivity analysis model configured to determine a weight of each execution trace in the reference use-case scenarios, wherein the sensitivity analysis model classifies each execution trace, or group of execution traces, associated to a reference use-case scenario as a main or an auxiliary event trace, or group thereof, according to their weight.

8. The method of claim 6, comprising:

deploying the application with a package comprising algorithms of a machine learning classification model, and reporting the use of the use-case scenario continually in real-time.

9. The method of claim 8, wherein the machine learning is by way of a convolutional neural network configured for RGB image processing that receives as training patterns: execution trace vectors, use-case vectors, and event vectors for respective R, G, B components; and a recurrent neural network for learning temporal dependencies and sequential user interaction steps of said use-case scenario from said training patterns.

10. A computer implemented method for analyzing a usage of an application by a user, said application provided by a software vendor, wherein the method, that by way of a computer comprising one or more hardware processors and a memory coupled to the one or more hardware processors, wherein the memory includes computer instructions which when executed by the one or more hardware processors causes the one or more hardware processors to perform the method, comprises steps of:

automatically instrumenting the application by way of binary instrumentation that modifies executable binary code of the application to insert trace-generating stubs into the executable binary code of the application, without modifying source code of the application and without implementing Application Programming Interface (API) calls, to generate execution traces at use-case reference points, wherein the execution traces comprise function, method, stack, and heap information concerning the application with respect to a sequence of interaction steps, thereby automatically generating relevant information by the application itself;

presenting the user with a reference use-case scenario to follow by way of the application;

capturing said execution traces during a user interaction with the application during said reference use-case scenario;

collecting metadata associated with said application and events during the user interaction with the application during said reference use-case scenario;

correlating said execution traces to a sequence of interaction steps of said reference use-case scenario, wherein the metadata is automatically generated by the application itself by way of the binary instrumentation;

repeating said steps of presenting, capturing and correlating for multiple reference use-case scenarios;

producing reference event traces with reference use-case scenarios for input to a training process of a classification model that maps presented reference use-case scenarios to known use-case scenarios;

learning the classification model for said execution traces from said repeating, and including said metadata within said learning of said classification model, wherein said metadata comprises information about a software license and about a license account executing the application, and wherein said metadata comprises information about said software license consisting of at least one among timestamps, access permissions, and number of runtime allowance; and thereafter said learning, applying said classification model to uncorrelated execution traces to report a use of unseen use-case scenarios;

detecting and reporting a software license issue with said application during said reference use case scenario for said events and said unseen use-case scenarios, wherein the uncorrelated execution traces of the application due to the binary instrumentation detect activities of the application with respect to authentication services for single sign-on (SSO) and authorization services, wherein said authorization services evaluate roles, rules, and attributes comprising said metadata and enforce said access privileges associated with said software license, thereby providing to an Independent Service Vendor (ISV) associated with the application, a measure of value that the user receives for said software license from using the application with said authentication and authorization services.

11. The method of claim 10, comprising:

detecting the event during the unseen use-case among those of a user event, a device event or environmental event;

generating execution traces responsive to said detection of said event;

capturing and correlating said event to a user step of said use-case scenario; and updating said learning and reporting on said use of unseen use-case in view of said event.

12. The method of claim 10, wherein the environment includes a cloud load balancer, instrumented to expose data relevant to use-case information and detect activities of the application with respect to:

distributing user traffic and tasks across multiple instances of applications, reducing risk that the application experiences limited performance issues, and optimize network response time and avoid uneven overloading.

13. The method of claim 10, wherein the cloud load balancer is further configured by way of:

Identify and Access Management (IAM) Service Components, instrumented to expose data relevant to use-case information and detect activities of the application with respect to:

authentication services including one among multi-factor authentication (MFA), session and token management;

authorization services to address roles, rules, and attributes;

directory services including one among an identity store, directory federation, metadata synchronization, and virtual directory; and user management to provide provisioning and release of services, self-service, and delegation of actions and responsibilities.

* * * * *